Jan. 15, 1935.  N. H. BRODELL  1,988,158
TUBING
Filed May 12, 1934
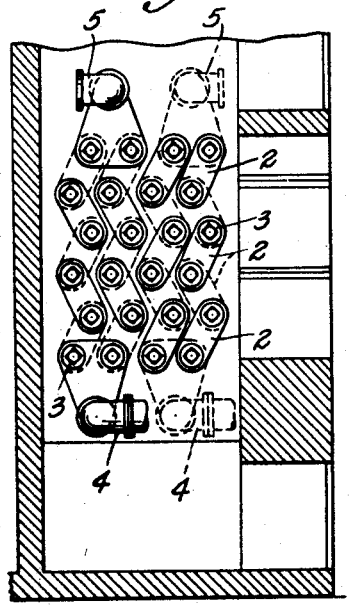
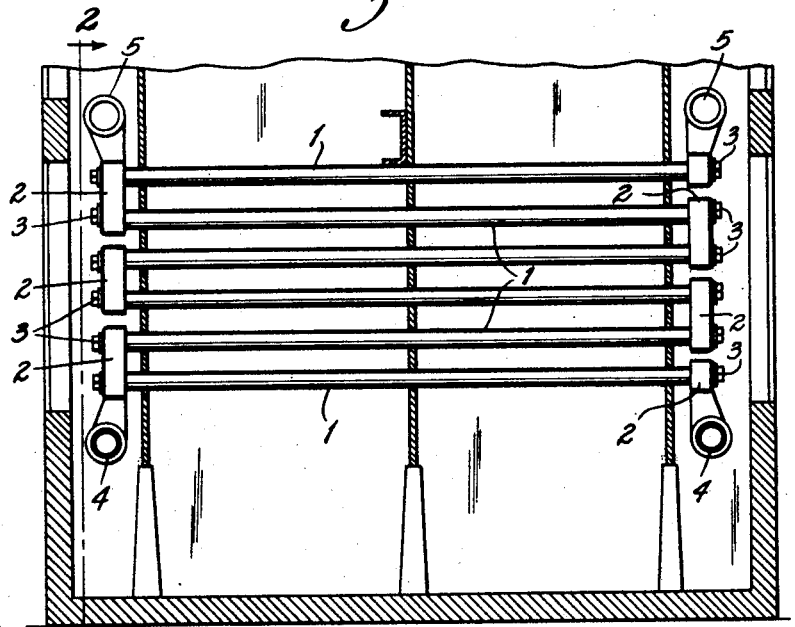
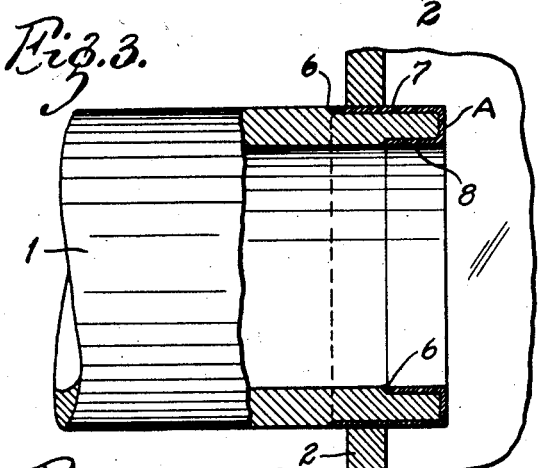
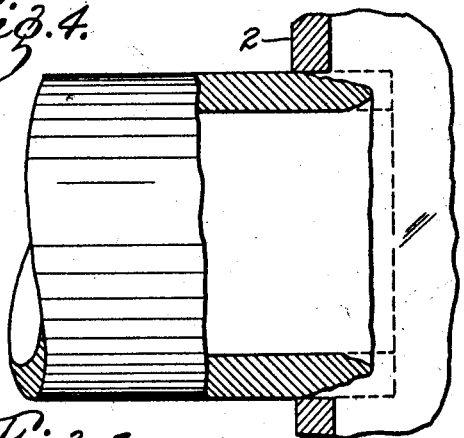
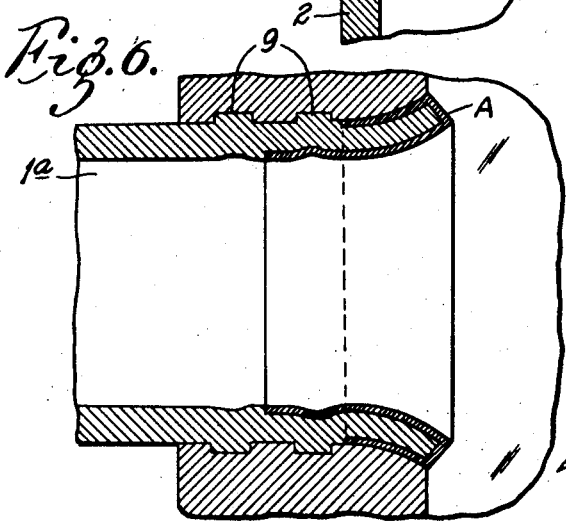
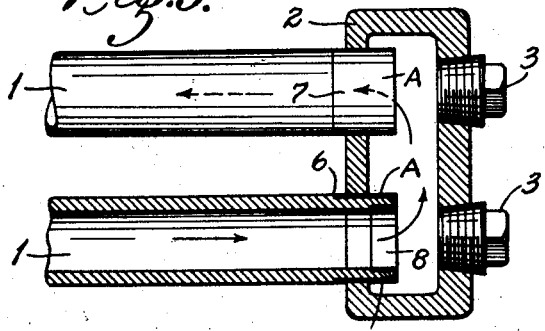
INVENTOR
Nathan H. Brodell
HIS ATTORNEYS.

Patented Jan. 15, 1935

1,988,158

UNITED STATES PATENT OFFICE 1,988,158

TUBING

Nathan H. Brodell, Canton, Ohio, assignor to The Timken Roller Bearing Company, Canton, Ohio, a corporation of Ohio Application May 12, 1934, Serial No. 725,238

2 Claims. (Cl. 137—75)

Metal tubing is extensively used in various apparatus such as steam boilers, oil distillation apparatus and the like wherein the tubing and especially the ends thereof are exposed to mechanical erosion and to the corrosive action of hot liquid or gaseous fluids, which sooner or later destroy the ends of the tubes and put the apparatus out of commission. The principal object of the present invention is to devise tubing with ends that are resistant to such erosion and corrosion, without substantial increase of cost above that of plain tubing and without adversely affecting the capacity or strength of the tubing or of the apparatus. The invention consists principally in equipping the exposed end or ends of the tubing with a shell or shells of stainless steel or the like. It also consists in having such shell extend over the area where the erosive and corrosive activities are greatest. It also consists in forming such shell with its inner and outer surfaces substantially flush with the inner and outer surfaces of the main body of the tubing so as not to decrease the effective size of the bore of the tubing or require a larger hole in the tube sheet to accommodate the tubing.

In the accompanying drawing, wherein like reference numerals refer to like parts wherever they occur, Fig. 1 is a part sectional and part side elevational view of a portion of an oil distillation apparatus embodying my invention;

Fig. 2 is a vertical section on the line 2—2 in Fig. 1;

Fig. 3 is a detail view of a tube embodying my invention, the end portion thereof being shown in section and extending through the wall of the header;

Fig. 4 is a view similar to Fig. 2 illustrating the worn condition of the unprotected end of common tubing;

Fig. 5 is a detail view, mainly section, of the end portion of two tubes fitted in the header or return bend; and Fig. 6 illustrates a modification wherein the end of the tube is mechanically interlocked with the wall of the header and also expanded into contact therewith.

The apparatus illustrated in Fig. 1 comprises part of a distillation apparatus of a type common in the oil refining industry. In this construction, the tubes 1 are grouped in vertically spaced banks, of which the lower bank only is shown. The tubes of this bank are arranged in four upwardly extending zig-zag rows, and tubes of each row are connected by headers or return bends 2 to form a coil. In accordance with common practice, the headers are provided opposite the ends of the tubes with clean out openings that are closed by threaded plugs 3. Located at one end of the bank of tubes are double inlet and outlet fittings 4 and 5 that are connected to the respective lower and upper tubes of two adjacent coils. Similar double inlet and outlet fittings are located at the opposite end of said bank of tubes and are connected to the respective lower and upper tubes of the two remaining coils. By this arrangement, the fluid flows in one direction through two of the coils and in the opposite direction through the other two coils.

In the above apparatus, the ends of the tubes are continuously exposed to mechanical erosion due to turbulence of the fluid within the headers and corrosive chemical action of the hot fluids which, sooner or later, destroy the end portion of the tubes as indicated in Fig. 3. When the corrosion of the outer surface of the tube extends through the wall of the header, the apparatus becomes unfit for use until repaired by the replacement of the worn tubing.

According to the present invention, the body of my tube is made of ordinary tube steel but one or both of its ends are armored with shells A of metal which is resistant to both mechanical erosion and chemical corrosion, such metal being designated hereinafter by the generic name "stainless steel". In order that the bore of the tube shall not be decreased, the wall of the tubing is cut away on its inner surface to a depth substantially equal to the thickness of the stainless steel and the inner surface of the shell is made substantially flush with the inner surface of the tube. Likewise, in order that the holes in the header shall not be larger than is required for an ordinary tube of the same outside diameter as the body portion of my tube, the outer surface of the end of the tube is cut away to a depth substantially equal to the thickness of said shell and is made substantially flush with the outer surface of the body of my tube.

The shell A may be conveniently made from a sheet of stainless steel stamped into the form of a hollow-walled sleeve of the shape and size required to fit over the tip or reduced end of the tube. This shell is fitted on the end of the tube and directly welded thereto, as by autogenous welding of the ends of the sleeve, as indicated at 6.

The outer cylindrical skirt 7 of the shell is preferably made of such length as to extend outwardly just through the wall of the header when the parts are assembled. The inner cylindrical skirt 8 of the shell is preferably made somewhat longer so as to extend through the region of greatest erosive and corrosive activity.

Among the advantages of the foregoing invention are the following: As stainless steel is quite resistant to mechanical erosion and to the corrosive activities of flue gases and the fluids met with in oil refining processes and the like, the life of the tube is greatly increased and the apparatus may be run for a much longer period without stoppage due to wear of tubes than has heretofore been practicable. As only a small quantity of stainless steel is needed, the cost of my tube is small in comparison with the cost of like tubes made wholly of stainless steel. As stainless steel is stronger than ordinary tube steel and as the stainless steel shell of my tube extends through the tube sheet or wall of the header, the resulting structure is stronger than would be the case if plain tubing were used. It is an especial advantage of my construction that it does not decrease the effective bore of the tube but utilizes the full capacity of the body of the tube without at all affecting the tube sheet or header.

In the modification illustrated in Fig. 5, the wall of the header is provided with annular grooves into which the wall of the tube 1a is expanded in the form of ribs 9 that interlock mechanically with such grooves. In this same modification, the inner wall of the hole in the header is flared and the protected end portion of the tube is expanded in contact with said portion.

What I claim is:

1. Plain metal tubing having the end portion of its wall reduced in thickness and having a shell of stainless steel encasing such reduced portion, said shell being substantially flush with the main body of the tubing both on the inside and on the outside thereof and said shell being welded to the plain tube metal.

2. In apparatus of the kind described, the combination of a tube sheet and tubing extending therethrough, said tubing comprising plain metal tubing having the end portion of its wall reduced in thickness and having a shell of stainless steel encasing such reduced portion, said shell being substantially flush with the main body of the tubing on the inside and on the outside thereof and said shell being welded to the plain tube metal, the outside portion of said shell extending entirely through the tube sheet and the inside portion being shorter than the outside portion.

NATHAN H. BRODELL.